United States Patent
Kraft

(10) Patent No.: US 8,449,934 B2
(45) Date of Patent: *May 28, 2013

(54) TOFU PREP

(76) Inventor: Marie B. Kraft, Ambler, PA (US)

( * ) Notice: Subject to any disclaimer, the term of this patent is extended or adjusted under 35 U.S.C. 154(b) by 1490 days.

This patent is subject to a terminal disclaimer.

(21) Appl. No.: 11/726,548

(22) Filed: Mar. 22, 2007

(65) Prior Publication Data

US 2008/0131568 A1 Jun. 5, 2008

Related U.S. Application Data

(60) Provisional application No. 60/868,605, filed on Dec. 5, 2006.

(51) Int. Cl.
*A01J 25/11* (2006.01)

(52) U.S. Cl.
USPC .................................... 426/478; 99/495

(58) Field of Classification Search
USPC ................ 426/478; 99/452, 456, 457, 495, 99/496; 100/37, 104, 110, 126, 127, 131, 100/136; 425/84, 410, 406; 220/752, 756, 220/769, 771
See application file for complete search history.

(56) References Cited

U.S. PATENT DOCUMENTS

| | | | |
|---|---|---|---|
| 3,995,544 | A | 12/1976 | Farley |
| 5,272,969 | A | 12/1993 | McDonald |
| 5,320,031 | A | 6/1994 | Whitney |
| 6,092,460 | A | 7/2000 | Engelhardt |
| 6,672,204 | B2 | 1/2004 | Fiorello |

FOREIGN PATENT DOCUMENTS

| | | | |
|---|---|---|---|
| CN | 200960029 | * | 10/2007 |
| JP | 57-144932 | * | 9/1982 |
| JP | 05-056747 | * | 3/1993 |
| JP | 2001-008616 | * | 1/2001 |
| JP | 2001-095478 | * | 9/2001 |
| JP | 2001-286258 | * | 10/2001 |
| JP | 2003-93247 | * | 4/2003 |
| JP | 2003-219797 | * | 8/2003 |
| JP | 2004-357657 | * | 12/2004 |

OTHER PUBLICATIONS

JP 2003-93247, English Abstract and Machine Translation, Apr. 2003.*
JP 2001-286258, Murauchi, Pickling Device, Machine translation, Oct. 2001.*
USPTO translation of Murauchi JP 2001 286258, Oct. 2001.*

* cited by examiner

*Primary Examiner* — Rena Dye
*Assistant Examiner* — C. A Smith
(74) *Attorney, Agent, or Firm* — James Ray & Assoc

(57) ABSTRACT

An apparatus for easily removing excess moisture from blocks of tofu. The apparatus is constructed of a sturdy plastic material and is substantially box or rectangular shaped. It is designed to be approximately the size of a block of commercially available tofu. The container which holds the tofu has perforations on the bottom which permits the extracted moisture to drain out and away from the unit. The container with the tofu features four feet on the corners with a drain tray to capture the extracted moisture. There is a flat member that sits on the top of the tofu and an inner top lid that has a spring attached to it. The inner top lid engages a pair of arm like projections and the spring engages another tray that sits on the top of the tofu so that as the spring exerts pressure on the flat member on the tofu water is removed from the tofu.

6 Claims, 3 Drawing Sheets

TOFU PREP

CROSS REFERENCE TO RELATED APPLICATIONS

This application is closely related to and claims benefit from U.S. Provisional Application Ser. No. 60/868,605 filed Dec. 5, 2006.

FIELD OF THE INVENTION

The present invention relates, in general, to an apparatus, and, more particularly, the present invention relates to an apparatus and to a method for accommodating and for removing excess water from a standard block of tofu as sold in stores.

BACKGROUND OF THE INVENTION

Many individuals have realized the health and wellness benefits that can be obtained by simply decreasing or completely eliminating meat from their diets. Some individuals may wish to eliminate meat from their diet for animal rights reasons, as well.

Tofu is a plant based protein source that many people turn to in order to create the right balance of nutrients in their diet. Thus, tofu is widely used as a substitute for the protein that is generally obtained from eating meat. However, tofu preparation can be inconvenient and messy as it requires the cook to squeeze excess moisture from a block of tofu in order to prepare it. A block is the normal way that tofu is sold. Improperly prepped tofu can result in an inedible meal that can make some individuals completely give up on tofu as a meat alternative. Current methods of removing the moisture from a block of tofu include squeezing and pressing the tofu with paper towels and other heavier kitchen utensils that are generally inadequate and cumbersome and most do not always allow for storage of the tofu in the refrigerator.

Thus, it would be advantageous if there were a means available that would provide those individuals who wish to remove meat from their diets a simple apparatus that can be used to easily remove excess moisture from blocks of tofu and provide a means of storing such prepared tofu.

SUMMARY OF THE INVENTION

In a first aspect the present invention provides an apparatus for removing excess moisture from blocks of tofu as commonly sold in grocery and health food stores. The apparatus comprises a first container member having a first predetermined size and a first predetermined shape. A second container member is disposed inside the first container for holding a block of tofu, such second container having a second predetermined size and a second predetermined shape, such second container having a plurality of apertures formed through a bottom portion of such second container. A pair of arm like projections that point in opposite directions are disposed on upper surfaces and on opposite sides of the second member. There is a first substantially flat plate member disposed inside the second member and placed on top of such block of tofu, the first substantially flat plate member having at least one raised portion on an upper surface of the first substantially flat plate member. A second substantially flat plate member is positioned for engagement with the pair of arm like projections and at least one biasing means is connected to a bottom surface of the second substantially flat plate member and caged between the at least one raised portion on the upper surface of the first substantially flat plate member and the bottom surface of the second substantially flat plate member for pushing against such block of tofu for pressing excess moisture out of such block of tofu.

In a second aspect the present invention provides a method for removing excess moisture from blocks of tofu as commonly sold in grocery and health food stores. The method comprises the steps of providing a first container member. Such first container member has a first predetermined size and a first predetermined shape. Disposing a second container member inside the first container member. Such second container member has a second predetermined size and a second predetermined shape and also has a plurality of apertures formed through a bottom portion of the second container. Placing a block of tofu in the second container member. The next step is placing a first substantially flat plat member inside the second container member on top of the block of tofu. Such first substantially flat plate member has at least one raised portion on an upper surface thereof. This is followed by the step of engaging a second substantially flat plate member, which has a biasing means connected to a bottom surface thereof, with a pair of arm like projections pointing in opposite directions that are disposed on upper surfaces and on opposite sides of the second member. There is a step of caging the biasing means between such at least one raised portion on the upper surface of the first substantially flat plate member and a bottom surface of the second substantially flat plate member when the second substantially flat plate member is engaged with the pair of arm like projections. Then applying pressure on the block of tofu by the first substantially flat plate member. Such first substantially flat plate member being forced downward by the biasing means. The next step is removing water from the block of tofu by the pressure exerted by the first substantially flat plate member as a result of the action of the biasing means. Collecting the excess water removed from the block of tofu in the first container and a step of storing the tofu, with excess water removed, in a refrigerated area until ready for use.

OBJECTS OF THE INVENTION

It is, therefore, one of the primary objects of the present invention to provide an apparatus for removing excess moisture from a block of tofu.

Another object of the present invention is to provide an apparatus for removing excess moisture from a block of tofu that is easy to use.

Still another object of the present invention is to provide an apparatus for removing excess moisture from a block of tofu that is made of plastic.

Yet another object of the present invention is to provide an apparatus for removing excess moisture from a block of tofu that has a perforated inner chamber wherein the excess moisture can be drained out.

Another object of the present invention is to provide an apparatus for removing excess moisture from a block of tofu that uses a biasing means for applying pressure to the block of tofu.

These and various other objects and advantages of this invention will become apparent after a full reading of the following detailed description, particularly, when read in conjunction with the attached drawings as described below and the appended claims.

Figure 1:
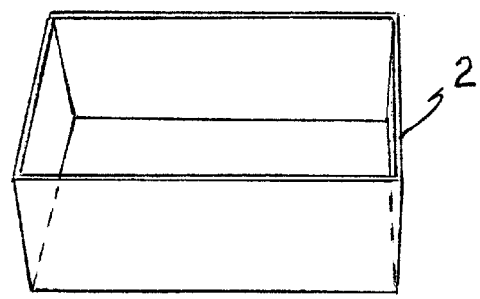
FIG. 1 is a perspective view of a first container for use in removing excess water from a block of tofu.
Figure 2:
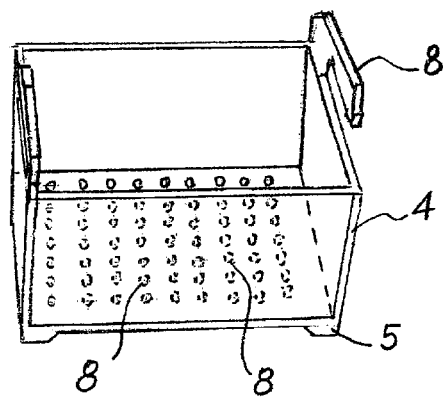
FIG. 2 is a perspective view of a second container for placing inside the container shown in FIG. 1 for use in removing excess water from a block of tofu.
Figure 3:
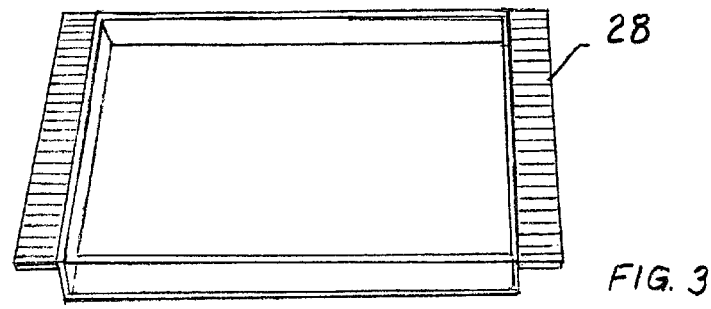
FIG. 3 is a perspective view of a lid member for use with the first container shown in FIG. 1.
Figure 4:
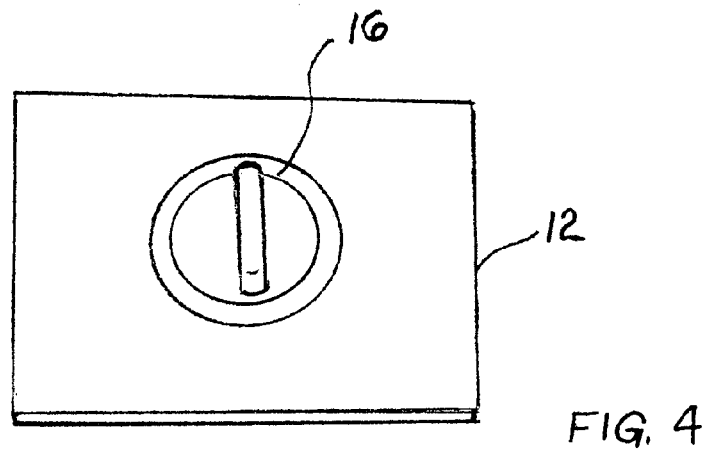
FIG. 4 is a perspective view of a first substantially flat plate member for placing on top of the block of tofu.
Figure 5:
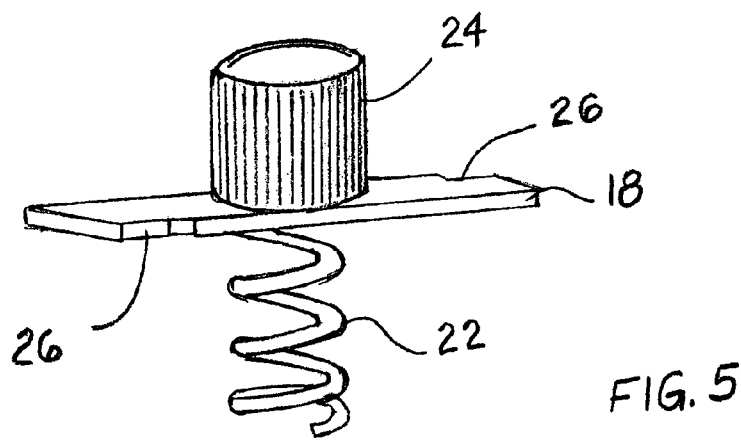
FIG. 5 is a perspective view of the second substantially flat plate member with such biasing means attached.
Figure 6:
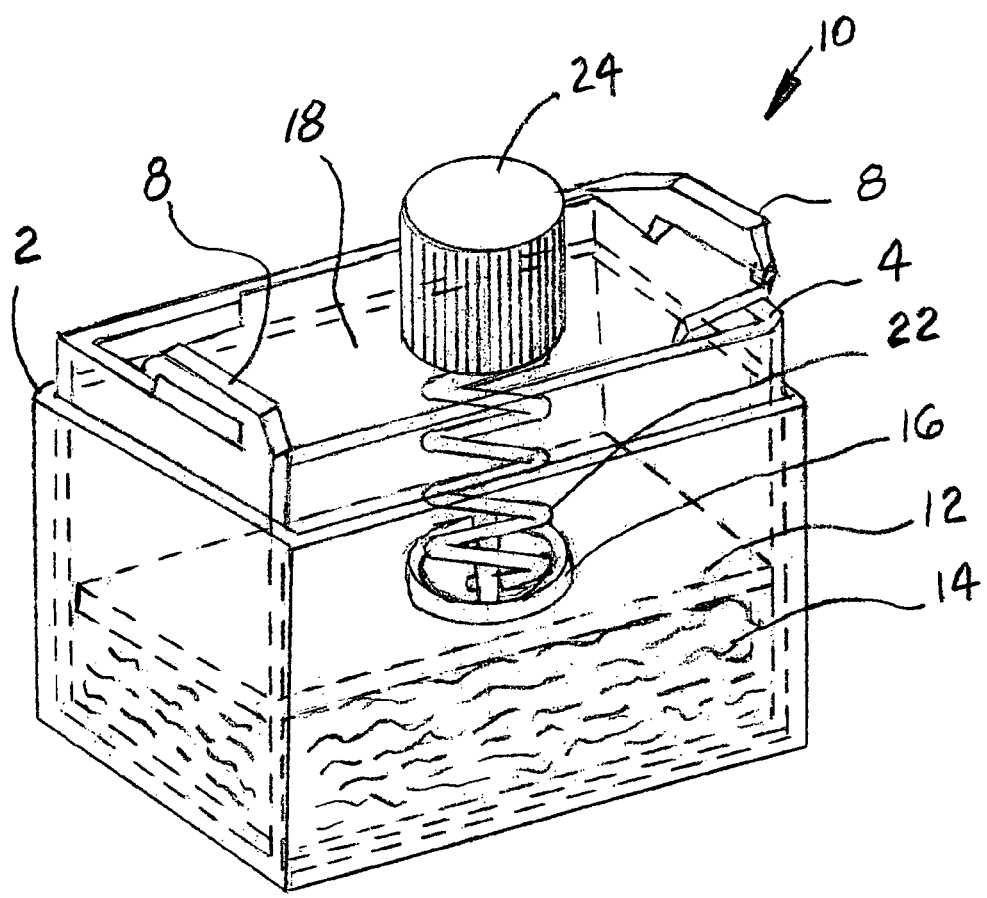
FIG. 6 is a perspective view of the apparatus with all the parts in place for removing water from the block of tofu.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

In a first aspect the present invention provides an apparatus, generally designated 10, for removing excess moisture from blocks of tofu as commonly sold in grocery and health food stores. The apparatus 10 comprises a first container member 2 having a first predetermined size and a first predetermined shape. A second container member 4 is disposed inside the first container 2 for holding a block of tofu, such second container 4 having a second predetermined size and a second predetermined shape, such second container 4 having a plurality of apertures 6 formed through a bottom portion of such second container 4.

A pair of arm like projections 8 that point in opposite directions are disposed on upper surfaces and on opposite sides of the second member 4. There is a first substantially flat plate member 12 disposed inside the second member 4 and placed on top of such block of tofu 14, the first substantially flat plate member 12 having at least one raised portion 16 on an upper surface of the first substantially flat plate member 12. A second substantially flat plate member 18 is positioned for engagement with the pair of arm like projections 8 and at least one biasing means 22 is connected to a bottom surface of the second substantially flat plate member 18 and caged between the at least one raised portion 16 on the upper surface of the first substantially flat plate member 12 and the bottom surface of the second substantially flat plate member 18 for pushing against such block of tofu 14 for pressing excess moisture out of such block of tofu 14.

It should be noted that such second container 4 has feet 5 disposed on each corner. The feet 5 raise the second container enough to make it much easier for the water to be drawn away.

The apparatus 10 further includes a handle member 24 disposed on an upper surface of the second substantially flat plate member 18 for ease in handling the second substantially flat plate member 18 with at least one biasing means 22 connected thereto. The biasing means 22 is compressed when the second flat platform member 18 is forcibly engaged with the pair of arm like projections 8 and the opposite end of the biasing means 8 engages the raised portion 16 of the first substantially flat member 12.

As the biasing means 8 which was compressed and as it attempts to return to its uncompressed position applies pressure to the first flat plate member 12 which in turn applies pressure to the block of tofu 16 causing excess water to be forced out of the block of tofu. The excess water is collected in the first container 2 as it drains through the apertures 6.

The second substantially flat member 18 has a pair of notches 26 disposed on diagonally opposed corners which makes it easier to engage the arm like projections 8.

It is presently preferred that such first 2 and such second containers 4 are formed of plastic. It is also preferred that such first 12 and second flat plate members 18 as well as the lid member 28 also be made of plastic. It is preferred that such pair of arm like projections 8 are integrally formed as a part of the second container member 4. It is also preferred that such biasing means 22 is a spring 22.

Thus, the block of tofu 14 is placed in the second container member 4 and the first flat plate member 12 is placed on top of the tofu. The second flat plate member 18 with the biasing means attached engages the arm like projections 8 and the biasing means engages the raised portion 16 of the first flat plate member. The biasing means 22 applies pressure 12 to the first flat plate member 12 which causes the block of tofu to be squeezed and such excess water to be removed. After the excess water has been removed and discarded the prepared block of tofu can be placed in the first container 2 and a marinade poured therein and the lid member 28 placed on top of the first container 2 the first container can be placed in the refrigerator. After the tofu has been marinated with the appropriate marinade it is now ready for use.

In a second aspect the present invention provides a method for removing excess moisture from blocks of tofu as commonly sold in grocery and health food stores. The method comprises the steps of providing a first container member 2. Such first container member 2 has a first predetermined size and a first predetermined shape. Disposing a second container member 4 inside the first container member 2. Such second container member 4 has a second predetermined size and a second predetermined shape and also has a plurality of apertures 6 formed through a bottom portion of the second container 4. Placing a block of tofu 14 in the second container member 4. The next step is placing a first substantially flat plat member 12 inside the second container member 4 on top of the block of tofu 14. Such first substantially flat plate member 12 has at least one raised portion 16 on an upper surface thereof. This is followed by the step of engaging a second substantially flat plate member 18, which has a biasing means 22 connected to a bottom surface thereof, with a pair of arm like projections 8 pointing in opposite directions that are disposed on upper surfaces and on opposite sides of the second member 4. There is a step of caging the biasing means 22 between such at least one raised portion 16 on the upper surface of the first substantially flat plate member 12 and a bottom surface of the second substantially flat plate member 18 when the second substantially flat plate member 18 is engaged with the pair of arm like projections 8. Then a step of applying pressure on the block of tofu 14 by the first substantially flat plate member 12. Such first substantially flat plate member 12 being forced downward by the biasing means 22. The next step is removing water from the block of tofu 14 by the pressure exerted by the first substantially flat plate member 12 as a result of the action of the biasing means 22. Collecting the excess water removed from the block of tofu 14 in the first container 2 and a step of storing the tofu, with excess water removed, in a refrigerated area until ready for use. After the excess water that was collected in the first container 2 is poured off such first container 2 can be used to store the tofu. A marinade is added to the tofu 14 in the first container 2 to give it flavor and the lid member 28 placed on top of the first container 2 and the unit stored in the refrigerator until the tofu is ready for use.

The method further includes a step of compressing the biasing means 22 when the biasing means is caged between the raised portion 16 on an upper surface of the first substantially flat plate member 12 and a bottom surface of second substantially flat plate member 18 when the second substantially flat plate member 18 is engaged with the pair of arm like projections 8. The method includes the additional step of applying a downward pressure on the upper surface of the first substantially flat plate member 12 by the biasing means 22.

Thus, the present invention provides an apparatus for easily removing excess moisture from blocks of tofu. The apparatus is constructed of a sturdy plastic material and is substantially box or rectangular shaped. It is designed to be approximately the size of a block of commercially available tofu. The container which holds the tofu has perforations on the bottom which permits the extracted moisture to drain out and away from the unit. The base of the unit features four feet on the corners with a drain tray to capture the extracted moisture. There is a flat member that sits on the top of the tofu and an inner top lid that has a spring attached to it. The inner top lid engages a pair of arm like projections and the spring engages another tray that sits on the top of the tofu so that as the spring exerts pressure on the flat member on the tofu water is removed from the tofu.

While a presently preferred embodiment and alternate embodiments of the present invention has been described in detail above, it should be understood that various other adaptations and/or modifications of the invention can be made by those persons who are particularly skilled in the art without departing from either the spirit of the invention or the scope of the appended claims.

I claim:

1. A method for removing excess moisture from blocks of tofu as commonly sold in grocery and health food stores, said method comprising the steps of:
    (a) providing a first container member, said first container member having a first predetermined size and a first predetermined shape;
    (b) disposing a second container member within said first container member, said second container member having a second predetermined size and a second predetermined shape, said second container having a plurality of apertures formed through a bottom portion of said second container;
    (c) placing a block of tofu in said second container member;
    (d) placing a first substantially flat plate member inside said second container member on top of said block of tofu, said first substantially flat plate member having at least one raised portion on an upper surface thereof;
    (e) engaging a second substantially flat plate member having a biasing means connected to a bottom surface thereof with a pair of arm like projections pointing in opposite directions that are disposed on upper surfaces and on opposite sides of said second container member;
    (f) caging said biasing means between said at least one raised portion on an upper surface of said first substantially flat plate member and a bottom surface of said second substantially flat plate member when said second substantially flat plate member is engaged with said pair of arm like projections;
    (g) applying pressure on said block of tofu by said first substantially flat plate member, said first substantially flat plate member being forced downward by said biasing means;
    (h) removing water from said block of tofu;
    (i) collecting said water removed from said tofu in said first container; and
    (j) storing said tofu, with excess water removed, in a refrigerated area until ready for use.

2. The method according to claim 1, wherein said method further includes a step of compressing said biasing means when said biasing means is caged between said at least one raised portion on an upper surface of said first substantially flat plate member and a bottom surface of said second substantially flat plate member when said second substantially flat plate member is engaged with said pair of arm like projections.

3. The method according to claim 2, wherein said method includes the additional step of applying a downward pressure on said upper surface of said first substantially flat plate member by said biasing means.

4. The method, according to claim 1, wherein said second predetermined size is smaller than said first predetermined size.

5. The method, according to claim 1, wherein said first and said second predetermined shapes are substantially rectangular.

6. The method, according to claim 1, wherein an outer perimeter of said second container member is smaller than an inner perimeter of said first container member.

* * * * *